(12) United States Patent
Moosmann et al.

(10) Patent No.: US 6,316,855 B1
(45) Date of Patent: Nov. 13, 2001

(54) SPINDLE MOTOR WITH A SPECIAL CONTACT ARRANGEMENT

(75) Inventors: Georg Moosmann, Tennenbronn; Jürgen Oelsch, Hohenroth, both of (DE); King Hock Lee, Melaka (MY)

(73) Assignee: Precision Motors Deutsche Minebea GmbH (DE)

( * ) Notice: Subject to any disclaimer, the term of this patent is extended or adjusted under 35 U.S.C. 154(b) by 0 days.

(21) Appl. No.: 09/530,366
(22) PCT Filed: Oct. 30, 1998
(86) PCT No.: PCT/EP98/06877
§ 371 Date: Jun. 30, 2000
§ 102(e) Date: Jun. 30, 2000
(87) PCT Pub. No.: WO99/23740
PCT Pub. Date: May 14, 1999

(30) Foreign Application Priority Data

Oct. 31, 1997 (DE) .............................. 197 48 150

(51) Int. Cl.[7] .................................................. H02K 11/00
(52) U.S. Cl. ........................... 310/71; 310/67 R; 310/91; 360/99.08
(58) Field of Search .................... 310/67 R, 71, 310/89, 91; 360/98.07, 99.04, 99.08

(56) References Cited

U.S. PATENT DOCUMENTS

| 5,173,628 | * | 12/1992 | Yoshida et al. | 310/71 |
| 5,548,458 |   | 8/1996  | Pelstring et al. | 360/99.08 |
| 5,572,384 |   | 11/1996 | Kumagai et al. | 360/99.08 |
| 5,635,781 | * | 6/1997  | Moritan | 310/71 |
| 5,705,866 |   | 1/1998  | Oguchi | 310/67 R |
| 5,982,061 | * | 11/1999 | Grantz et al. | 310/67 R |
| 6,091,172 | * | 7/2000  | Kakinuma et al. | 310/71 |

FOREIGN PATENT DOCUMENTS

| 2930649 C2 | 2/1980 | (DE) . |
| 3347360 A1 | 7/1985 | (DE) . |
| 3502284 A1 | 7/1986 | (DE) . |
| 3710659 A1 | 10/1988 | (DE) . |
| 19644755 A1 | 5/1997 | (DE) . |
| 558181 | 1/1993 | (EP) . |
| 0 740 397 A2 | 10/1996 | (EP) . |

OTHER PUBLICATIONS

English Translation of Abstract of German Patent Specification 29 30 649, Feb. 7, 1980.
English Translation of Abstract of German Laid Open Print DE 33 47 360 A1, Jul. 11, 1985.
English Translation of Abstract of German Laid Open Print DE 35 02 284 A1, Jul. 24, 1986.
English Translation of Abstract of German Laid Open Print DE 37 10 659 A1.
English Translation of Abstract of German Laid Open Print DE 196 44 755 A1.

* cited by examiner

Primary Examiner—Tran Nguyen
(74) Attorney, Agent, or Firm—Skjerven Morrill MacPherson LLP; Alan H. MacPherson

(57) ABSTRACT

The invention relates to a spindle motor with a contact arrangement which comprises a stationary base flange carrying a central spindle, a hub which is pivotably borne on the spindle by means of suitable bearings and on which at least one hand disk is arranged, and a stator-sided winding assembly fastened to the base flange by means of a winding support, with the winding assembly being arranged opposite a rotor magnet, with electric contacting of the winding assembly being accomplished by means of a terminal fitting equipped with terminal lugs to which the leads coming from the winding assembly are connected. The invention is characterized by contact pins being arranged in/on the winding support which allow direct contacting between the leads of the winding assembly and the terminal lugs of the terminal fitting.

9 Claims, 5 Drawing Sheets

SPINDLE MOTOR WITH A SPECIAL CONTACT ARRANGEMENT

Figures 1, 2:
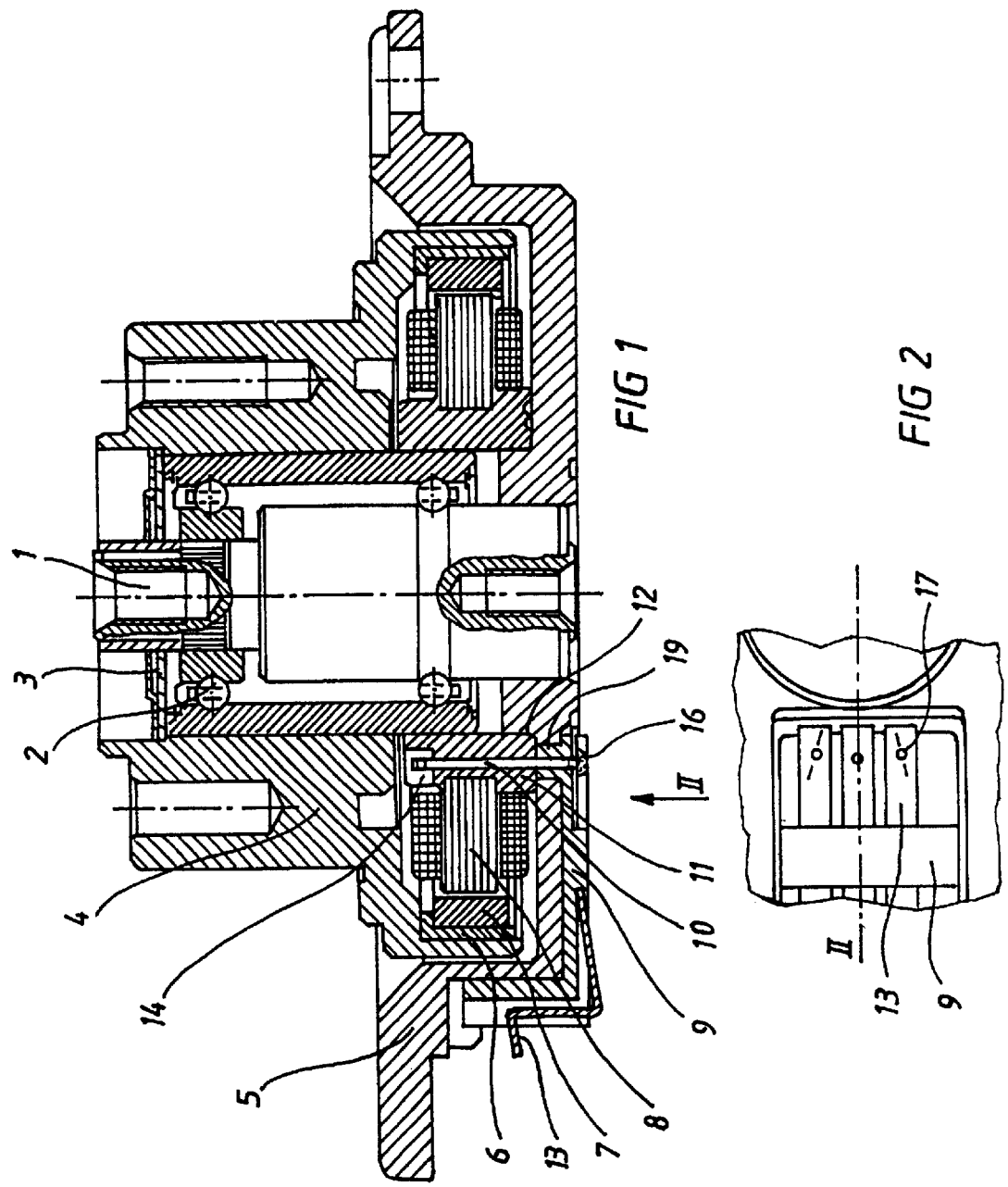

The invention relates to a spindle motor with a contact arrangement as described in the preamble of claim 1. Such spindle motors are used for example for driving hard disks.

There have been spindle motors for driving hard disks with a stationary base flange carrying a central spindle. In addition, a hub is provided which is pivotably mounted on the spindle by means of suitable bearings and on which at least one hard disk is arranged. On its inner circumference, the hub is provided with a magnetic yoke with a permanent magnet with a winding assembly located opposite to it which is attached to the base flange by means of a winding support. The electric connection with the winding assembly is established by means of a terminal fitting equipped with terminal lugs. This terminal fitting is attached at the bottom of the base flange and has a projecting part which fits into a recess provided on the base flange. The projecting part of the terminal fitting in turn is provided with a recess through which the leads coming from the winding assembly are guided and which are then connected to the terminal lugs by means of winding or soldering.

The disadvantage of the previous way of contacting consists in the fact that the spindle motor must have been assembled completely before the leads are connected. Only then is it possible to guide the leads manually through the recesses provided on the terminal fitting and to connect them to the terminal lugs.

Another disadvantage is the fact that the recesses through which the leads are guided must be provided with a dust-proof and insulating seal by applying a sealing material after bonding.

Moreover, it is disadvantageous that it is impossible to coat the winding assembly with the insulating material before connecting the leads, as the leads must remain uncoated until bonding is performed.

In order to handle the disadvantages the object of the present invention is to develop a spindle motor with a contact arrangement of the initially mentioned type in such a way that rapid and simple contacting is enabled, the winding assembly can be coated before bonding, and the contacting area can be insulated and sealed appropriately.

According to the invention, this problem is solved due to the characteristics as described in claim 1.

The invention is characterized by contact pins being provided in/on the winding support, to the free ends of which the leads of the winding assembly can be connected and the other ends of which project from the recess on the base flange and can be connected to the terminal lugs with the terminal fitting being attached.

This has the advantage that the leads of the winding assembly can be bonded with the contact pins before the spindle motor is finally assembled. Furthermore, the winding assembly already connected to the contact pins may be coated completely without impairing or making subsequent bonding with the terminal lugs difficult.

Another advantage consists in the fact that the leads may be bonded with the respective contact pins fully mechanically. In so doing, the leads are wound around the contact pins mechanically in a first step, and these points of contact may then be bonded in a second step by means of mechanical soldering.

In a first embodiment, the contact pins are arranged within, that is in the area between the winding assembly and the spindle.

In another embodiment, the contact pins are arranged outside, that is radially outside the winding assembly. For this purpose, the winding support is provided with a support located outside which is arranged between the rotor magnet of the hub and the base flange.

More advantageous features and embodiments are objects of the dependent claims.

Figure 3:
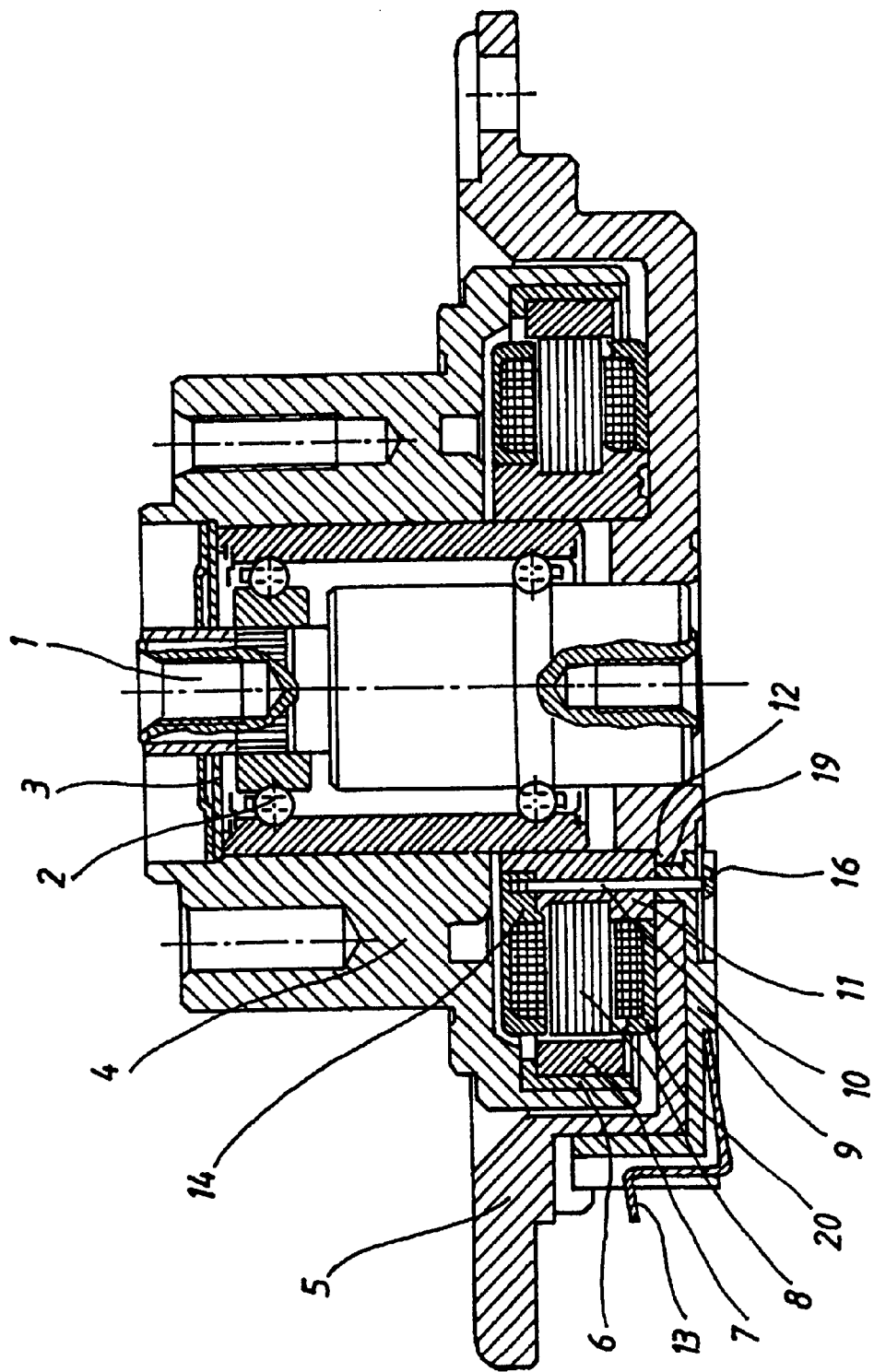
Figure 4:
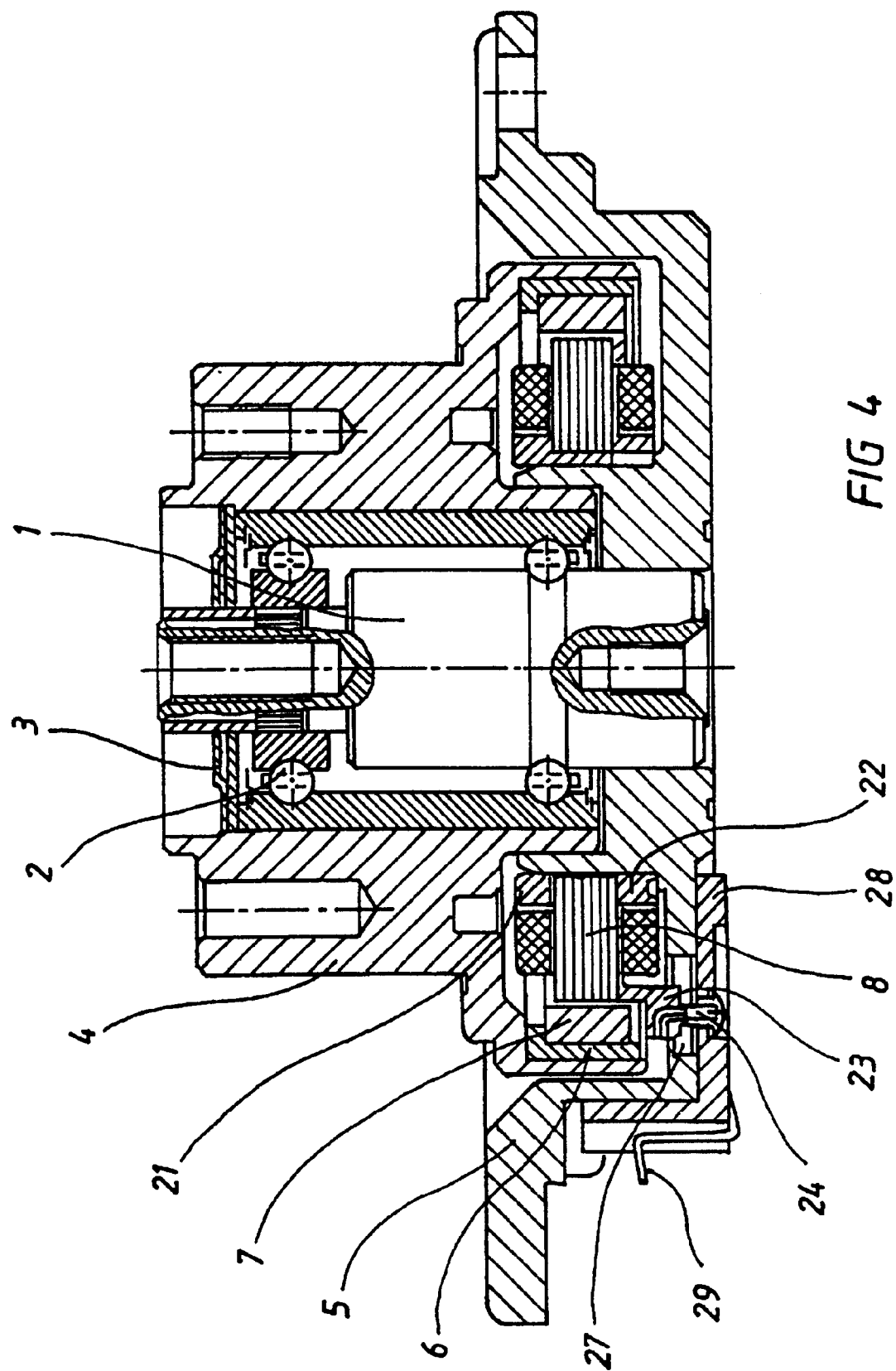
Figure 5:
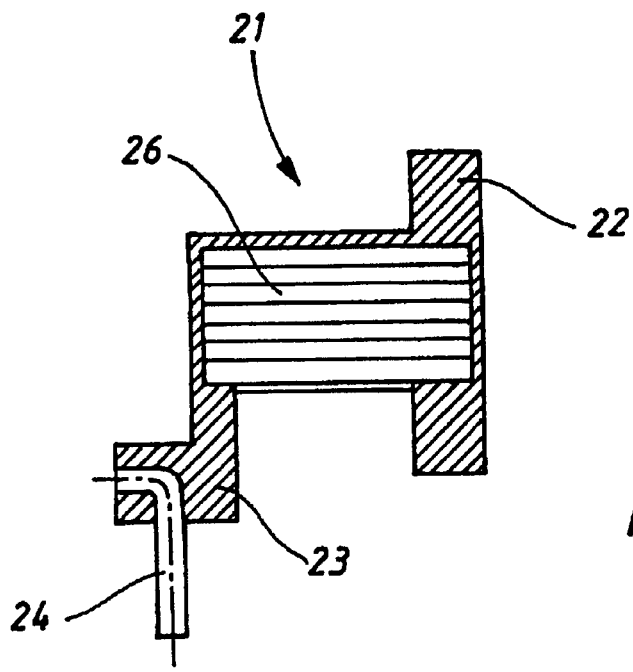
Figure 6:
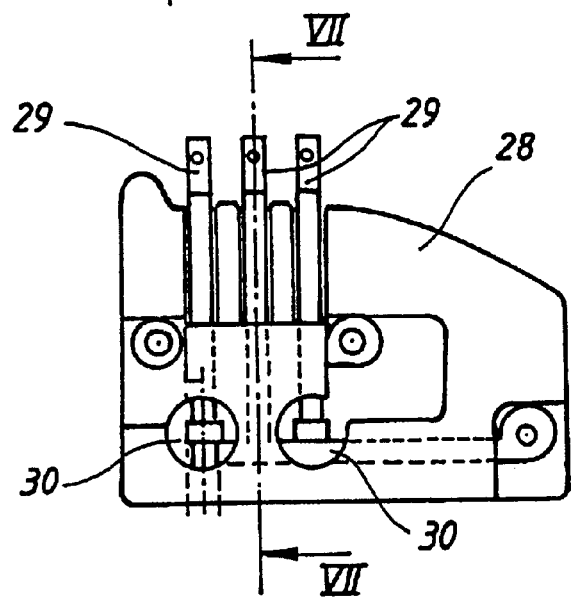
Figure 7:
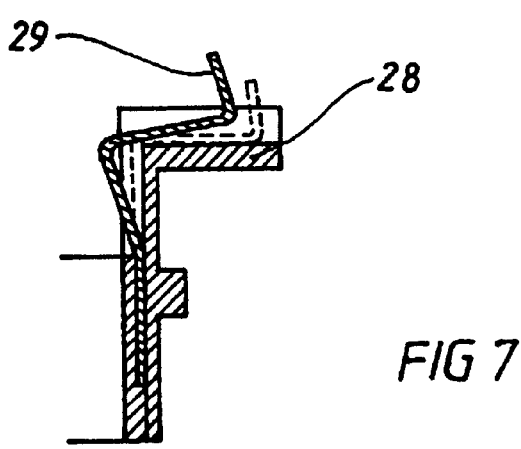
Figure 8:
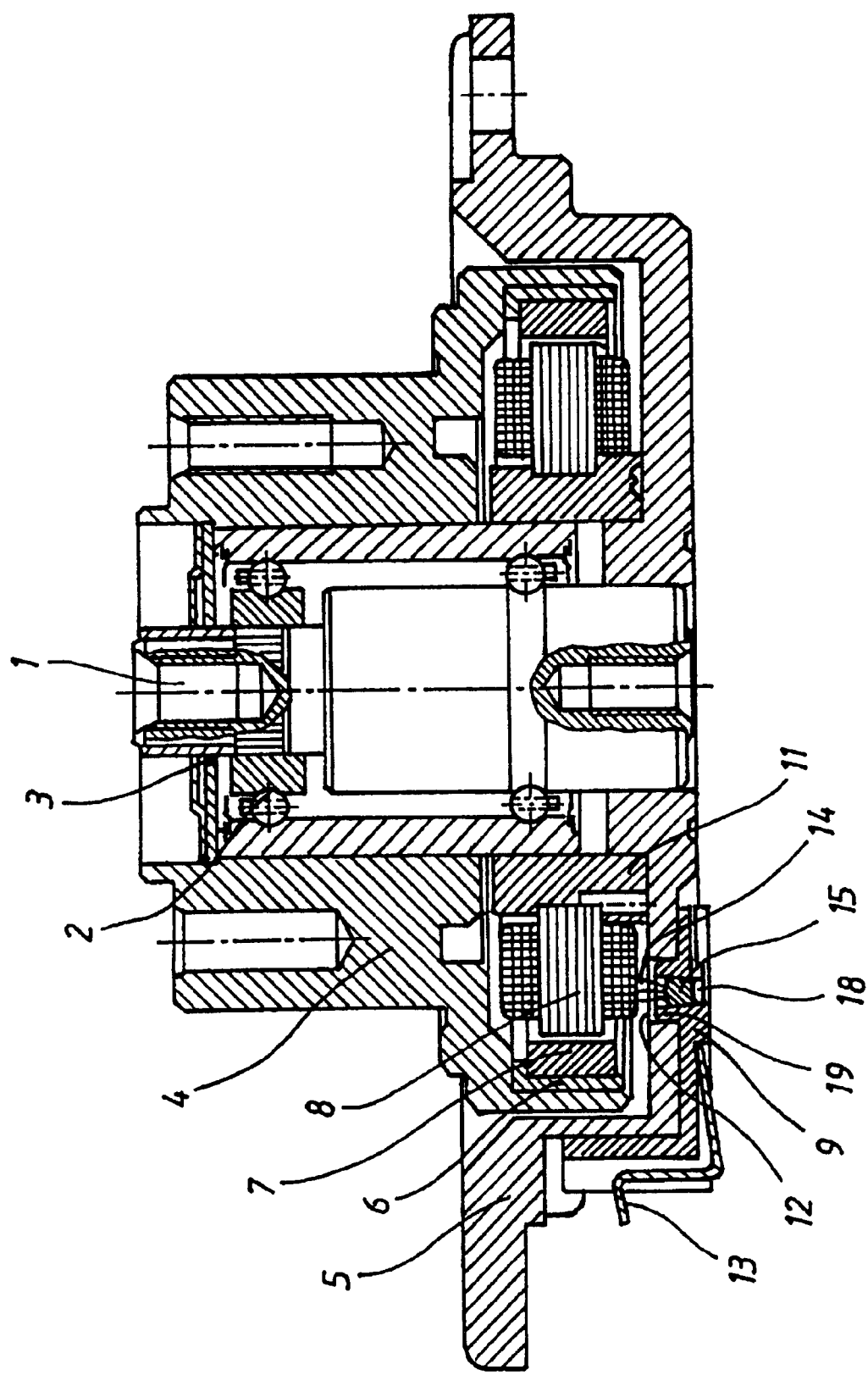

In the following, the innovation will be explained in more detail with the aid of drawings showing several embodiments. The drawings and their descriptions a illustrate more features typical of the invention and advantages of the innovation. They show:

FIG. 1: A cross-sectional view of the first embodiment of the spindle motor's contact arrangement according to the invention;

FIG. 2: A view of the contact arrangement from below in direction of arrow II;

FIG. 3: A variant of the embodiment according to FIG. 1, with the winding assembly coated;

FIG. 4: A cross-sectional view of another embodiment of the spindle motor's contact arrangement;

FIG. 5: An enlarged view of the winding support according to FIG. 4;

FIG. 6: A top view of the terminal fitting according to FIG. 4;

FIG. 7: A cross-sectional view of the terminal fitting according to FIG. 6 along line VII—VII;

FIG. 8: A cross-sectional view of a spindle motor for hard disks according to the prior art.

FIG. 1 shows a first embodiment of the contact arrangement for a spindle motor according to the invention. As regards FIG. 8, identical parts are provided with identical reference numbers.

Compared with the embodiment according to FIG. 8, the invention now comprises several contact pins 10 which are arranged in or on winding support 11. These contact pins 10 are preferably arranged such that they can be moved longitudinally, in other words, they are not mounted rigidly on winding support 11.

Winding support 11 is designed in such a way that the free ends of contact pins 10 project from the winding support. Since the contact pins 10 are preferably designed in such a way that they can be moved longitudinally they can be moved such that the upper end to be bonded projects from winding support 11 as far as possible. Leads 14 of the winding assembly can then be bonded with the upper free ends of contact pins 10. For this purpose, leads 14 are wound around the free ends of contact pins 10 mechanically or manually. Subsequently, leads 14 are soldered to contact pins 10 manually or in the solder bath.

Winding assembly 8 which has already been bonded with contact pins 10 and attached to winding support 11 can now be mounted on base flange 5. Contact pins 10 are arranged in such a way that their free ends which are guided through recess 12 project into base flange 5. Terminal fitting 9 can now be attached to base flange 5 in such a way that the lower free ends of contact pins 10 project from the corresponding recesses 18 of terminal fitting 9 attached to base flange 5.

Terminal lugs 13 are provided with bores 17 or alternatively with spring contacts into which the ends of contact pins 10 are inserted. Contact pins 10 can then be soldered to terminal lugs 13. This results in bond 16. When using spring contacts, solderless connection of contact pins 10 to terminal lugs 13 is possible.

FIG. 2 shows a bottom view of terminal fitting 9 with terminal lugs 13. The individual terminal lugs 13 and the corresponding bores 17 into which the ends of contact pins 10 are inserted are evident.

FIG. 3 shows an embodiment which essentially is identical to the embodiment according to FIG. 1 and 2. In this embodiment, winding assembly 8 is additionally coated with plastic material 20 to achieve improved mechanical and electrical stability or reliability.

Coating with plastic material 20 is performed after attaching and soldering leads 14 of winding assembly 8 to contact pins 10, however, preferably before mounting winding assembly 8 on base flange 5. Subsequent bonding of contact pins 10 with terminal lugs 13 is not impaired by coating, as plastic material 20 is not applied to the lower free ends of contact pins 10.

FIG. 4 shows a modified embodiment of the contact arrangement. In this case, contacting is performed farther outside (radially, as seen from spindle 1). FIG. 5 shows winding support 21 provided for this purpose which may be fitted with contact pins 24.

As evident from FIG. 4 and 5, winding support 21 comprises an inner support 22 and an outer support 23; wound core 26 is located in between. Several contact pins 24 are arranged on outer support 23 which can be L-shaped, for example. This shape has been used amongst others for reasons of mechanical stability. These contact pins so to speak are fastened to the outer support 23 rigidly and only have one free end which projects from winding support 23.

Base flange 5 is provided with another recess in the area of contact pins 24 which, however, is bigger as compared with the embodiment according to FIG. 1.

Leads 14 of winding assembly 8 are now connected directly at the location where contact pins 24 project from winding support 21. This is done in the known way by winding leads 14 around contact pins 24 and soldering them to them. This can be performed either mechanically or manually.

After attaching winding support 11 with winding assembly 8 to base flange 5, the free ends of contact pins 24 project from recess 27 of base flange 5.

Terminal fitting 28 with terminal lugs 29 is then fitted and the outer ends of contact pins 24 are bonded with terminal lugs 29. This is achieved by means of soldering, plugging or clamping as described above.

FIG. 6 shows terminal fitting 28 as seen from above. Recesses 30 for guiding contact pins 24 as well as the individual terminal lugs 29 including the contacting area are evident.

FIG. 7 shows a cross-sectional view of terminal fitting 28 including terminal lugs 29 according to FIG. 6, along line VI—VI.

FIG. 8 shows the structure of a spindle motor which is used to drive hard disk. The spindle motor comprises a stationary base flange 5 carrying a central spindle. A bell-shaped hub 4 is provided which is pivotally borne on the spindle by means of suitable bearings 2 and on which a minimum of one hard disk is arranged. Bearings 2 are sealed outside by means of a suitable sealing material 3. On its inner circumference, hub 4 is fitted with a magnet yoke 6 comprising permanent magnet 7, with a winding assembly 8 being arranged opposite to it which is connected to base flange 5 via winding support 11.

The electric connection of winding assembly 8 is established by means of a terminal fitting 9 equipped with terminal lugs 13. This terminal fitting 9 is attached at the bottom of base flange 5 and has a projecting part which fits into a recess 12 provided on base flange 5.

Projecting part 19 of terminal fitting 9 is also provided with a recess through which leads 14 coming from the winding assembly 8 are guided and which can be bonded with terminal lugs 13. The ducts of leads 14 are sealed by means of sealing material 15.

Drawing Legend

Spindle
Bearing
Seal
Hub
Base flange
Yoke
5 Magnet
Winding assembly
Terminal fitting
Contact pin
Winding support
10 Recess (in base flange 5)
Terminal lug
Leads
Sealing material
Bond
15 Bore (in terminal lug 13)
Recess (in terminal fitting)
Projecting part (of terminal fitting)
Plastic material
Winding support
20 Support (inner)
Support (outer)
Contact pin
Bond
Wound core
25 Recess (in base flange)
Terminal fitting
Terminal lug
Recess (in terminal fitting)

What is claimed is:

1. Spindle motor comprising a contact arrangement consisting of a stationary base flange carrying a central spindle, a hub being pivotably mounted on the spindle by means of suitable bearings and at least one hard disk arranged thereon, and a stator-sided winding assembly being attached to the base flange by means of a winding support and which is arranged opposite a rotor magnet, with an electric contacting of the winding assembly being accomplished by means of a terminal fitting equipped with terminal lugs, wherein connections between leads coming from the winding assembly to the terminal lugs are characterized by:

contact pins protruding from the winding support wherein said contact pins allow direct contacting between the leads of the winding assembly and the terminal lugs of the terminal fitting.

2. Spindle motor according to claim 1 characterized by contact pins being designed as straight pins leading through the winding support.

3. Spindle motor according to claim 1 characterized by the contact pins being designed as angled pins leading through the winding support.

4. Spindle motor according to claim 1 characterized by each of the leads of the winding assembly being connected to a free end of the contact pins.

5. Spindle motor according to claim 1 characterized by the leads being soldered to the contact pins.

6. Spindle motor according to claim 1 characterized by the contact pins leading through recesses of the terminal fitting to the terminal lugs attached to the latter.

7. Spindle motor according to claim 1 characterized by the contact pins being guided through bores in the terminal lugs and soldered to the terminal lugs.

8. Spindle motor according to claim 1 characterized by the contact pins protruding from the winding support in such a way that they may be moved axially.

9. Spindle motor according to claim 1 characterized by the winding assembly being coated with plastic material.

* * * * *